US005849385A

United States Patent [19]
Cummings et al.

[11] Patent Number: 5,849,385
[45] Date of Patent: Dec. 15, 1998

[54] DE-TACKIFIED LABELS EXTRUSION PROCESS APPLIED INTEGRATED LABEL PRODUCT

[75] Inventors: Paul M. Cummings, Grand Island; John R. Soltysiak, Blasdell; Dale C. Beland, Grand Island; Myron C. Heeb, W. Seneca; Grant J. Bingaman, Grand Island, all of N.Y.

[73] Assignee: Moore Business Forms, Inc., Grand Island, N.Y.

[21] Appl. No.: 684,689

[22] Filed: Jul. 22, 1996

Related U.S. Application Data

[62] Division of Ser. No. 368,963, Jan. 5, 1995.

[51] Int. Cl.[6] .......... C09J 7/02
[52] U.S. Cl. .......... 428/41.8; 428/42.3
[58] Field of Search .......... 428/41.8, 42.3

[56] References Cited

U.S. PATENT DOCUMENTS

| | | | |
|---|---|---|---|
| 4,151,319 | 4/1979 | Sackoff | 428/49 |
| 4,286,047 | 8/1981 | Bennett | 430/280 |
| 5,129,682 | 7/1992 | Ashby | 283/81 |
| 5,340,629 | 8/1994 | Rodighiero | 428/40 |

*Primary Examiner*—Jenna Davis
*Attorney, Agent, or Firm*—Nixon & Vanderhye P.C.

[57] ABSTRACT

In the manufacture of integrated labels it is desirable to apply pressure sensitive adhesive in a continuous manner, yet it is undesirable for active adhesive to be on one or more edges of the form since active adhesive can interfere with nip rollers upon entering a laser or other non-impact printer, or can otherwise interfere with proper operation of the printer. By using an adhesive—that is de-tackified by direct exposure to a sufficient type and dosage of electromagnetic radiation (such as a hot melt adhesive de-tackified by applying about 3000 mJ/cm$^2$ total dosage of ultraviolet radiation)—that problem may be avoided. Apparatus for producing integrated labels with the adhesive at one or more edges being de-tackified may include a first conveyor for conveying sheets (either in stacked or single sheet form) in a first direction, and at least one ultraviolet radiation source mounted adjacent a side of the conveyor parallel to the first direction. A stacker, packaging device (such as a shrink wrap machine), 90° conveyor, and/or turn table may also be utilized.

15 Claims, 3 Drawing Sheets

*Fig. 4*
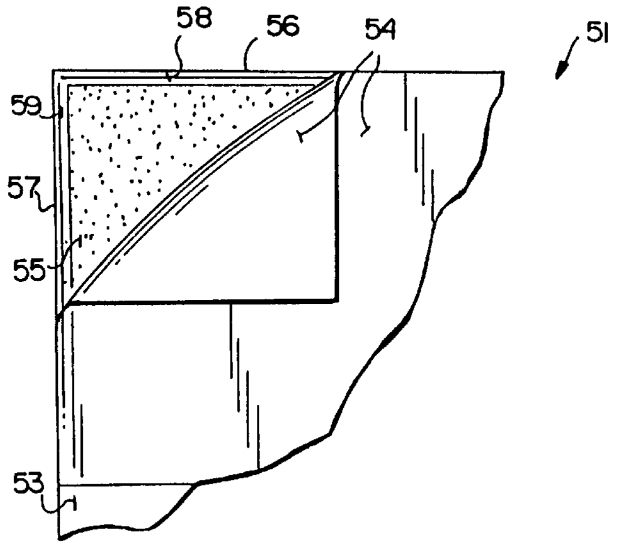
*Fig. 5*
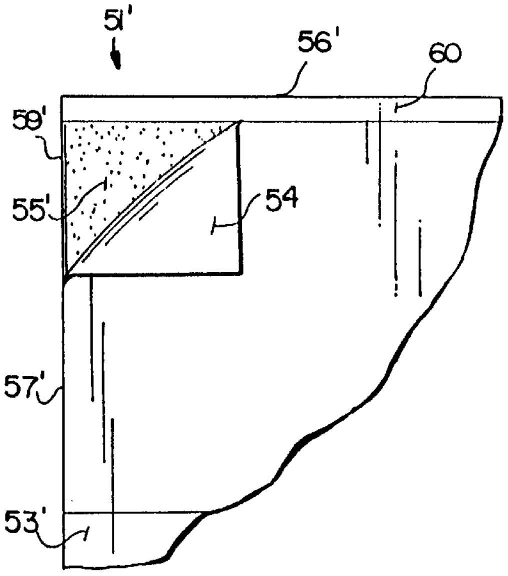
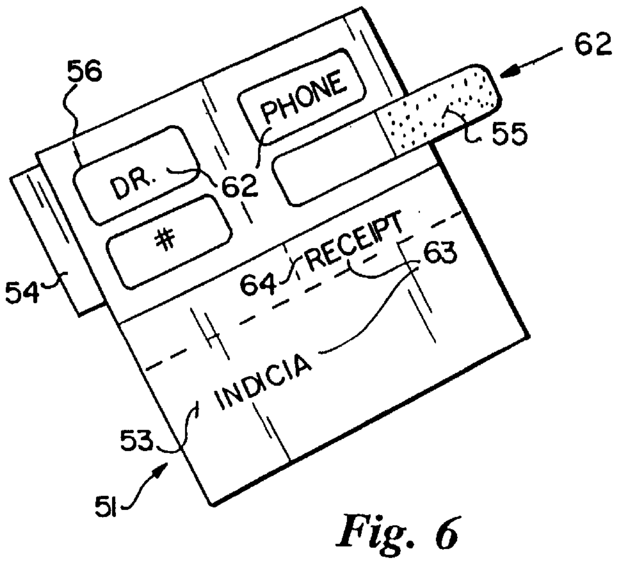
*Fig. 6*
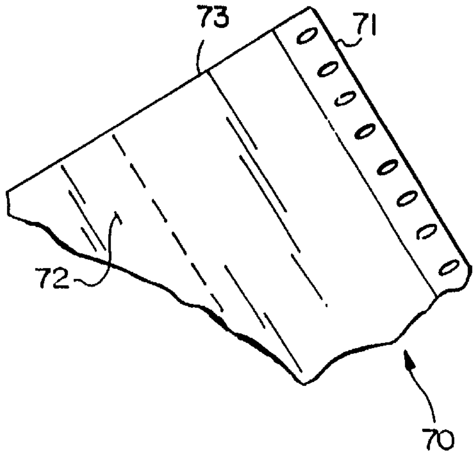
*Fig. 7*

DE-TACKIFIED LABELS EXTRUSION PROCESS APPLIED INTEGRATED LABEL PRODUCT

This is a division of application Ser. No. 08/368,963, filed Jan. 5, 1995 pending.

BACKGROUND AND SUMMARY OF THE INVENTION

Business forms in cut sheet format having at least one label (with pressure sensitive adhesive) and suitable for variable printing in a non-impact printer (such as a laser printer or other printer using a heat-curable toner) are referred to as integrated labels, and are exemplified by U.S. Pat. No. 5,129,682. In current manufacturing processes a hot melt extrusion die adhesive application method is utilized in which a continuous stream of pressure sensitive hot melt adhesive is applied to a release web, the release web is laminated to a paper web, one or more labels are die cut, and a continuous form format is cut into individual sheets. The paper face sheet typically comprises 20–28 lb. [per 500 sheets of paper per ream with dimensions of 17×22 inches] bond paper, while the release sheet is typically 25–50 lb. [per 500 sheets of paper per ream with dimensions of 22×36 inches] weight material. While this technique is extremely efficient and cost effective, the integrated label produced has pressure sensitive adhesive extending to at least one, and typically to two opposite cut edges of each form. This presents a significant contamination problem in non-impact printers for variably printing indicia on the integrated labels, such as laser printers or other non-impact printers utilizing a heat curable toner to apply indicia. Contamination can occur in the nip rolls for the laser printer, or in other printer paper guiding and feed system components, and the build up of adhesive can eventually cause poor performance of the printer or terminate its operation altogether, the adhesive building up due to the tacky nature thereof.

One way in which the above mentioned problem can be avoided is to apply the adhesive in a pattern rather than in a continuous strip. When applied in a pattern, the pattern includes a hiatus at the edges where the continuous web will be cut into sheets. However this manufacturing method is slower and more costly than the extrusion die continuous strip method. Therefore it is desirable to be able to solve the problem of the adhesive contaminating laser printers which act upon the integrated labels while at the same time allowing manufacture using the continuous strip application of pressure sensitive adhesive.

According to the present invention the desired results of preventing printer contamination as a result of adhesive built up, while still allowing production of the integrated labels utilizing the continuous strip method, are provided. The invention accomplishes these desired goals by utilizing as the pressure sensitive adhesive an adhesive that becomes de-tackified by direct exposure to a sufficient type and dosage of electromagnetic radiation. Typically this is accomplished utilizing a specially formulated hot melt adhesive that is sensitive to ultraviolet energy so that when exposed to, e.g., about 3000 mj/cm$^2$ total dosage of ultraviolet radiation, the edges of the integrated labels (where the release and bond sheet overlap) is rendered detackified, and therefore will not interfere with operation of, or otherwise contaminate, a non-impact printer. There are several aspects of the present invention employing this basic concept.

According to one aspect of the present invention a method of producing a sheet having at least one label and suitable for variable printing in a non-impact printer, is provided. The method comprises the steps of: (a) Applying a continuous strip of pressure sensitive adhesive, that is de-tackified by direct exposure to a sufficient type and dosage of electromagnetic radiation, to a release sheet. (b) Applying the release sheet to a first face of a web of paper so that the release sheet covers only a portion of the first face and the adhesive is attached to the web. (c) Forming at least one label in each of a plurality of predetermined lengths of the web at the portion of each web predetermined length covered by the release sheet. (d) Cutting the web into individual sheet lengths, each sheet having at least a first edge of the paper at which the release sheet is provided. (e) Exposing the first edge to the sufficient type and dosage of the electromagnetic radiation that de-tackifies the adhesive so that the adhesive at the first edge becomes de-tackified. And, (f) subsequently using the sheet in a heat-curable toner non-impact printer.

The adhesive is preferably rendered de-tackified by ultraviolet radiation, and step (e) is practiced by exposing a sheet to ultraviolet radiation, e.g. exposing hot melt adhesive to about 3000 mj/cm$^2$ total dosage of ultraviolet radiation.

The first edge may be a common edge of the paper and release sheet, and there may be the further step (g), between steps (d) and (e) of stacking a plurality of sheets in a stack with substantially aligned first edges. Step (e) is then practiced with the sheets in the stack (although alternatively step (e) may be practiced on individual sheets). Step (g) may be further practiced by placing chip board material on the top and the bottom of the stack.

Steps (a) through (d) may be practiced so that opposite first and second edges are commonly formed by the paper and release sheet, and step (e) may be practiced to apply electromagnetic radiation to the first and second edges one immediately after the other. Steps (a) through (d) may also be practiced so that a third edge, perpendicular to and extending between the first and second edges, is also commonly formed by the paper and release sheet, in which case there is the further step—either before or after step (e)—of exposing the third edge to a sufficient type and dosage of the electromagnetic radiation that the adhesive at the third edge becomes de-tackified.

There may also be the further steps, prior to step (f) of stacking a plurality of sheets in a stack, wrapping the stack in packaging, transporting the packaging to the site of the non-impact printer, and unpackaging the stack at the site of the non-impact printer.

According to another aspect of the present invention there is provided a method of acting upon a sheet comprising a first ply of paper and a second ply of a pressure sensitive adhesive release material overlapped with the first ply, with a pressure sensitive adhesive in a continuous strip between the first and second plies and holding them together in overlapped position, the second ply adjacent the first ply at at least a first edge of the first ply, the pressure sensitive adhesive being capable of being rendered de-tackified when directly exposed to a sufficient type and dosage of electromagnetic radiation, and at least one label formed by the first ply where the first and second plies overlap, the method comprising the step of (a) applying to the first edge the type of electromagnetic radiation with sufficient intensity and duration so that it de-tackifies the adhesive, so that the adhesive at the first edge becomes detackified. The detailed operations and steps, as described above, may also be utilized in the practice of this aspect of the invention.

The invention also comprises an integrated label. The integrated label of the invention has the following components: A first paper ply having a quadrate configuration and four edges and a first area. A second quadrate ply comprising a pressure sensitive adhesive release sheet having four edges. The first and second plies overlapping, including a first edge of the first ply aligned with or overlapped by the second ply. A continuous strip of pressure sensitive adhesive disposed between the overlapping portions of the first and second plies, releasably holding them together. At least one label formed in the first ply at the overlapping portions of the first and second plies. And, the adhesive at the first edge being de-tackified so that it will not stick to or interfere with continued operation of component parts of a heat-curable toner non-impact printer if the integrated label is passed through the printer, and the adhesive is tacky at the at least one label.

The second ply may have a second area significantly smaller than the first area, and the first edge of the first ply may be aligned with the first edge of the second ply and a second edge of the first ply aligned with a second edge of the second ply. In this case the adhesive at the second edge is also de-tackified so that it will not stick to component parts of or interfere with continued operation of a heat-curable toner non-impact printer if the integrated label is passed through the printer. The integrated label may be in a stack with a plurality of identical integrated labels having aligned edges, and the pressure sensitive adhesive may be a hot melt adhesive that becomes de-tackified when exposed to ultraviolet radiation.

According to another aspect of the invention there is provided apparatus for handling multi-ply sheets with pressure sensitive adhesive between the plies which is rendered de-tackified by direct exposure to ultraviolet radiation. The apparatus comprises: A stacker for stacking a plurality of sheets into a stack having aligned edges, and at least one ultraviolet radiation source emitting ultraviolet radiation that renders the adhesive de-tackified. A first conveyor may also be operatively associated with the stacker for conveying sheets in a first direction, and having first and second sides generally parallel to the first direction. The at least one ultraviolet radiation source preferably is adjacent to one of the first and second sides of the first conveyor for emitting ultraviolet radiation so that it is directed upon at least one edge of the sheets in the stack when the stack is on the first conveyor.

Each source of ultraviolet radiation may be a 300 nanometer nominal frequency, 300 watt/inch ultraviolet radiation source. The at least one source may comprise first and second sources mounted adjacent to the first and second sides of the first conveyor, respectively, and the first source may be mounted for movement toward and away from the second source to readily accommodate different size sheet edges between them. A third ultraviolet radiation source associated with a second conveyor extending perpendicular to the first conveyor also may be provided. Packaging means, a 90° conveyor, a turn table, and like components may also be associated with the apparatus, and a stacker may be provided either upstream or downstream of the first conveyor in the first direction.

It is the primary object of the present invention to provide for the quick and inexpensive extrusion die continuous strip method production of integrated labels, which labels do not have active adhesive at the edge portions thereof so that they will not interfere with continued operation of non-impact printers. This and other objects of the invention will become clear from an inspection of the detailed description of the invention, and from the appended claims.

BRIEF DESCRIPTION OF THE DRAWINGS

FIG. 4 is a detail rear view of an exemplary integrated label according to the invention, with the corner of the release sheet peeled back for clarity of illustration;

FIG. 5 is a view like that of FIG. 4 only of a modified form of the invention;

FIG. 6 is a front perspective view of the integrated label of FIG. 4, with the release sheet in exploded form for clarity of illustration; and FIG. 7 is a side detail view of a corner of another configuration of integrated label according to the invention.

DETAILED DESCRIPTION OF THE DRAWINGS

Figure 1:
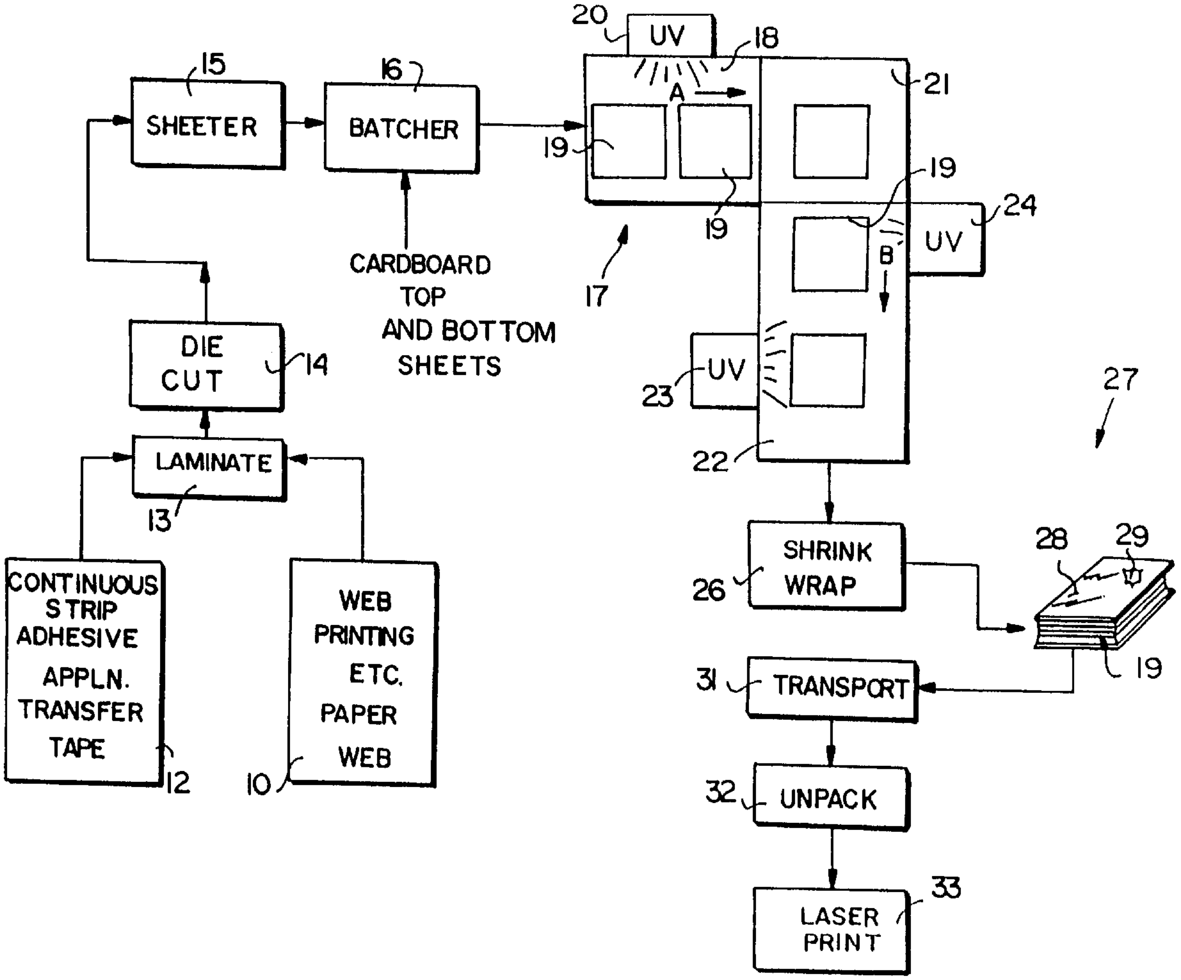
FIG. 1 is a schematic illustration of an exemplary method according to the present invention, also illustrating various components of the exemplary apparatus utilized according to the invention, in schematic form, and schematically illustrating a stack of integrated labels according to the present invention.

FIG. 1 schematically illustrates an exemplary method and apparatus according to the present invention. Box 10 illustrates conventional web printing of bond paper, such as 20–28 lb. bond paper with up to eight colors, typically six colors. As indicated schematically by box 12, release liner (e.g. 25–50 lb.) is unwound from a roll in web form, positioned in the press, and UV sensitive hot melt adhesive is applied using a continuous slot die process (which process is conventional and highly desirable per se), essentially producing transfer tape. The release liner may also be provided with printing before or after being coated with adhesive. The adhesive coated release liner is then laminated to the paper web, as indicated at box 13, and labels are die cut as indicated at 14. In a separate operation, or at the same time that the labels are die cut, the web may be cut into sheets as indicated by box 15 in FIG. 1.

The cut sheets from sheeter 15 are then—in the embodiment of FIG. 1—stacked or batched as indicated by box 16, utilizing a conventional stacker or batcher, with edges of the sheets aligned. For example the sheets may be batched in 125 sheet quantities with chip board material applied both on top of and under the stack, the application of the chip board material being done in a conventional manner. The stack is then conveyed to the apparatus 17 for exposing edges of the paper at which the release sheet is provided to a sufficient type and dosage of electromagnetic radiation so that the adhesive becomes de-tackified at the edges.

In the embodiment illustrated in FIG. 1, stacks of sheets indicated by reference numeral 19 are conveyed on a conveyor 18 in direction A past an ultraviolet radiation source 20 so that the adhesive at the edges of each sheet of each stack 19 closest to the source 20 becomes de-tackified. The source 20 may comprise a 300 nanometer nominal frequency, 300 watts/inch ultraviolet radiation source. The conveyor 18 conveys the sheets in the stacks 19 in direction A at a speed of about 10–20 feet per minute so that about 3000 mj/$cm^2$ total dosage of ultraviolet radiation is applied, which is sufficient to render the adhesive de-tackified at the edges between the paper and release sheets, yet significant energy is not wasted.

In the embodiment illustrated in FIG. 1, after treatment by ultraviolet radiation source 20, the stacks 19 are conveyed to the 90° conveyor 21 (which is conventional) and then subsequently conveyed by conveyor 22 in direction B, perpendicular to direction A. When moving in direction B the edges of all sheets of the stacks 19 parallel to direction B move past one or the other of the ultraviolet radiation sources 23, 24, which typically have the same rating as the source 20, so that all edges at which there may be adhesive between the release and bottom sheets have the adhesive de-tackified. The sources 23, 24 are provided one after the other on opposite sides of conveyor 22 so that one side of stack 19 is bombarded with UV radiation substantially immediately after the other (i.e. typically not at the same time since excessive heat build-up could occur).

After discharge from conveyor 22 the stacks 19 may be shrink wrapped in plastic, as indicated at box 26, utilizing conventional equipment to produce packages 27, illustrated schematically in FIG. 1. The package 27 comprises the stacks 19, wrapped in plastic 28, with the chip board top and bottom sheets as indicated by reference numeral 29 for the top sheet for the package 27. Packages 27 are then transported, as indicated at box 31, to the site of a non-impact printer, they are unpacked as indicated at 32 (by removing the plastic 28 and the chip board 29), and they are subsequently used in the laser printer 33 in which a heat curable toner is applied to the integrated labels, to apply variable imaging thereon.

Figure 2:
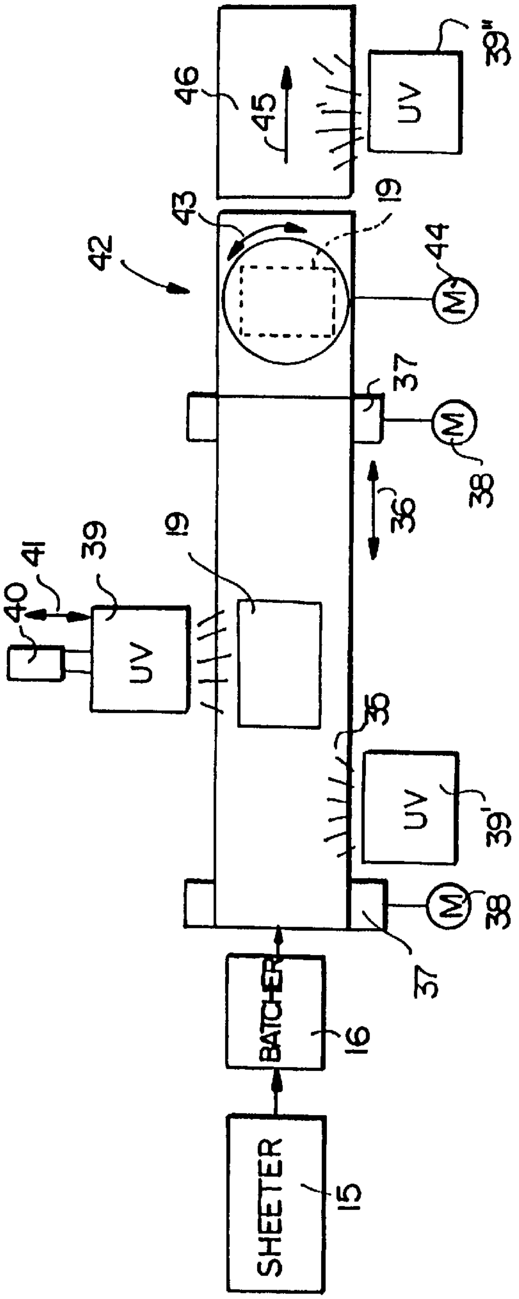
FIG. 2 is a view like that of FIG. 1 only showing a modified form of the apparatus for de-tackifying the adhesive adjacent the edges of the integrated labels produced according to the invention.

FIG. 2 illustrates a modified form of apparatus according to the invention for de-tackifying adhesive at the integrated label edges, again utilizing sheeter 15, batcher 16, and stacks 19. In the FIG. 2 embodiment instead of using two different sets of UV sources, as in FIG. 1, to render the adhesive at three separate edges de-tackified, a single set of UV sources is utilized.

FIG. 2 illustrates a conveyor 35 which can convey the stacks 19 in the dimension 36, that is in both directions in the dimension 36. This may be accomplished utilizing end rollers 37, one or both of which are powered by motors 38; one or both of which the motors 38 may be reversible. UV sources 39, 39' (of the same rating as the sources 20, 23, 24) are disposed on opposite sides of the conveyor 35, and the source 39 is movable by any suitable movement mechanism 40 (such as a linear screw, hydraulic or pneumatic cylinder, etc.) in the dimension 41, perpendicular to the dimension 36. This allows adjustment of the spacing between the sources 39, 39', and/or between the source 39 and the conveyor 35, to accommodate stacks 19 of different widths (dimensioned in the direction 41).

Downstream of the conveyor 35 is a conventional rotating conveyor 42, which can rotate the stack 19 delivered thereto 90° about a vertical axis (as indicated by the arrow 43), the conveyor 42 powered by motor 44 or the like. In a typical operation of the apparatus of FIG. 2, after the stack 19 is conveyed by the conveyor 35 past the sources 39, 39' in the direction 45, the stack 19 would be rotated to a 90° orientation—as indicated by dotted line stack 19 in FIG. 2. Then the conveyor 35 would be reversed and would convey the stack 19 again past the source 39, the source 39 having been moved by the mechanism 40 so that it had the proper position to de-tackify adhesive at the edge of each sheet of the stack 19 closest to the UV source 39. Then the conveyor 35 would be reversed again, and again convey the stack in the direction 45 to the conveyor 46 which would convey the stack 19 to a conventional shrink wrap or other packager 26, or the like. Another UV source 39" could be used adjacent conveyor 46 too.

Figure 3:
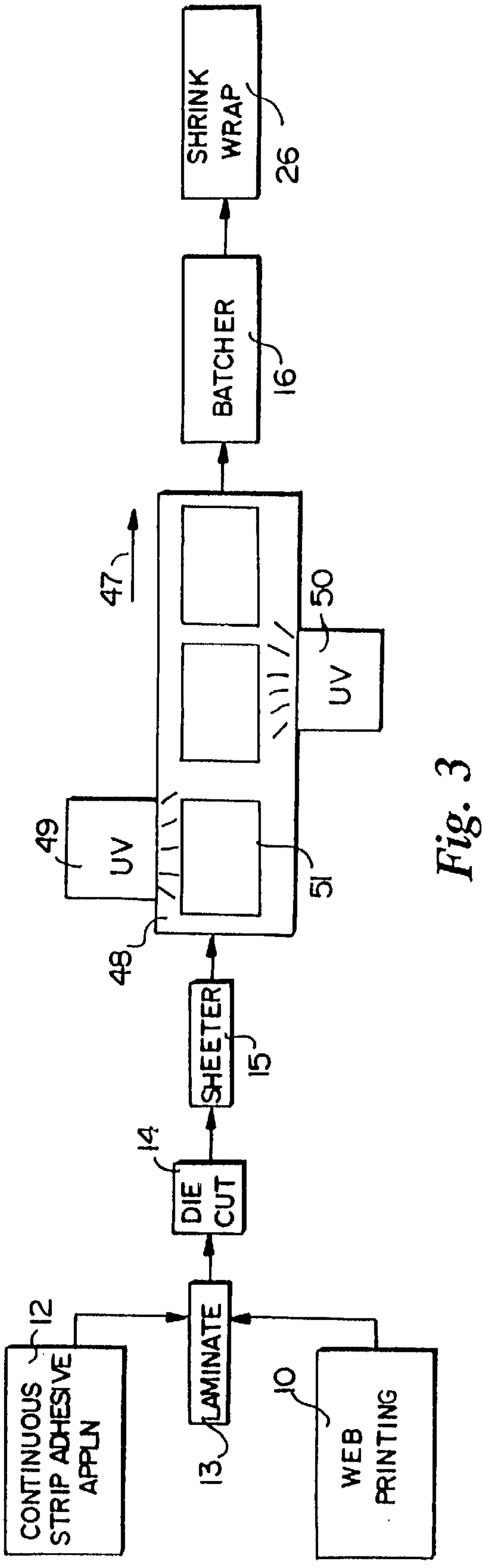
FIG. 3 is a view like that of FIG. 1 only showing a modified form of the apparatus for de-tackifying the adhesive adjacent the edges of the integrated labels produced according to the invention.

FIG. 3 indicates yet another modification of the apparatus of FIG. 1. In this case the batcher 16 is downstream of the conveyor 48 and the UV sources 49, 50 in the direction of conveyance 47, and adhesive only at the two edges parallel to the direction 47 are rendered de-tackified before shrink wrapping by shrink wrapping apparatus 26. In this case individual sheets 51 are exposed to the UV sources 49, 50 rather than stacks as in the FIGS. 1 and 2 embodiments.

An exemplary integrated label 51 may be utilized with the apparatus of FIG. 3 is shown in more detail in FIG. 4, FIG. 4 showing the rear face of the integrated label 51, while FIG. 6 showing the front face. The integrated label 51 comprises a first paper ply 53, e.g. of 20–28 lb. bond paper, having a quadrate configuration and four edges and a first area. A second quadrate ply 54 comprises a pressure sensitive adhesive release sheet having four edges. The pressure sensitive adhesive is shown at 55 in FIG. 4, and adheres to the bond ply 53 after being brought into contact therewith by the release sheet 54, while the release sheet 54 releases from the adhesive 55 (as shown by the peeled back corner in FIG. 4). The first and second plies 51, 54 overlap, including first and second edges 56, 57 of the first ply aligned with or overlapped by the second ply 54. The continuous (that is not patterned) strip of pressure sensitive adhesive 55 is disposed between the overlapping portions of the plies 53, 54, releasably holding them together.

The adhesive 55 is of the type that will become de-tackified when directly exposed to a sufficient type and dosage of electromagnetic radiation. Preferably the adhesive 55 is a hot melt adhesive which is sensitive to ultraviolet radiation. For example a suitable adhesive for this purpose is commercially available from Ecomelt Adhesives of Paramount, Calif., under the name T2 Ex731UV.

The adhesive 58, 59 at the edges 56, 57 is de-tackified, so that it will not stick to or interfere with continued operation of component parts of a laser or like non-impact printer. As described earlier with reference to FIGS. 1 through 3, the de-tackified edge portions 58, 59 are formed by exposure of the integrated label 51 to about 3000 mJ/cm$^2$ of ultraviolet radiation.

As illustrated in FIG. 5, which shows one alternative exemplary construction, a wide variety of other configurations may also be provided for the integrated label. In FIG. 5 components comparable to those in FIG. 4 are shown by the same reference numeral only followed by a "'" In the FIG. 5 embodiment, there is a significant area 60 of bond paper 53' between the edge 56' and the release sheet 54', so that de-tackification at the edge 56' is not necessary. Rather only de-tackified adhesive 59' at the edge 57' is provided.

FIG. 6 illustrates the front of the integrated label 51, with the release sheet 54 shown in exploded format only for clarity of illustration. FIG. 6 shows, for example, a plurality of labels 62 which have been die cut from the paper ply 53 (box 14 in FIGS. 1 and 3), as well as indicating indicia 63 which, for example, may be variably printed by a laser printer (box 33 in FIG. 1), or it may be non-variable printing applied to the original paper web (box 10 in FIGS. 1 and 3). Various lines of weakness, such as perforations, also may be provided, for example to define a receipt or like detachable portion 64. The integrated label 51 has a multitude of uses, such as for pharmacies.

FIG. 7 illustrates a slightly different configuration of integrated label 70 according to the present invention. In this embodiment the release sheet ply has an edge 71, with the paper ply 72 overlapping it, and an edge 73 therebetween, the adhesive at the edge 73 being de-tackified according to the present invention.

It will thus be seen that according to the present invention an advantageous method of producing integrated labels, a method of acting upon multi-ply sheets to render exposed adhesive de-tackified, an integrated label, and an apparatus for handling multi-ply sheets, have been provided which utilize the low cost and high speed extrusion die continuous strip method of integrated label production, yet avoid the problem of adhesive contaminating laser or like non-impact printers with which the sheets are utilized. While the invention has been herein shown and described in what is presently conceived to be the most practical and preferred embodiment thereof it will be apparent to those of ordinary skill in the art that many modifications may be made thereof within the scope of the invention, which scope should be accorded the broadest interpretation of the appended claims so as to encompass all equivalent processes, products, and apparatus.

What is claimed is:

1. An integrated label comprising:

a first paper ply having a quadrate configuration and four edges and a first area;

a second quadrate ply comprising a pressure sensitive adhesive release sheet having four edges;

the first and second plies overlapping, including a first edge of the first ply aligned with or overlapped by the second ply;

a continuous strip of pressure sensitive adhesive disposed between the overlapping portions of the first and second plies, releasably holding them together;

at least one label formed in the first ply at the overlapping portions of the first and second plies; and the adhesive at the first edge being de-tackified so that it will not stick to or interfere with continued operation of component parts of a heat-curable toner non-impact printer if the integrated label is passed through the printer, and the adhesive being tacky at said at least one label.

2. An integrated label as recited in claim 1, wherein said second ply has a second area significantly smaller than said first area, and wherein said first edge of said first ply is aligned with a first edge of said second ply, and wherein a second edge of said first ply is aligned with a second edge of said second ply, and wherein said adhesive at said second edge is de-tackified so that it will not stick to component parts of or interfere with continued operation of a heat-curable toner non-impact printer if the integrated label is passed through the printer.

3. An integrated label as recited in claim 1 in a stack with a plurality of identical integrated labels, the integrated labels in the stack having aligned edges.

4. An integrated label as recited in claim 1 wherein said pressure sensitive adhesive is hot melt adhesive which becomes de-tackified when exposed to a sufficient type and dosage of electromagnetic radiation.

5. An integrated label as recited in claim 2 in a stack with a plurality of identical integrated labels, the integrated labels in the stack having aligned edges.

6. An integrated label as recited in claim 2 wherein said pressure sensitive adhesive is hot melt adhesive which becomes de-tackified when exposed to a sufficient type and dosage of electromagnetic radiation.

7. An integrated label as recited in claim 3 wherein said pressure sensitive adhesive is hot melt adhesive which becomes de-tackified when exposed to a sufficient type and dosage of electromagnetic radiation.

8. An integrated label as recited in claim 4 wherein said hot melt adhesive becomes de-tackified when exposed to ultraviolet radiation.

9. An integrated label as recited in claim 1 wherein said pressure sensitive adhesive is an adhesive which becomes de-tackified when exposed to a sufficient dosage of ultraviolet radiation.

10. An integrated label as recited in claim 9 wherein said adhesive becomes de-tackified when exposed to about 3000 $mJ/cm^2$ total dosage of ultraviolet radiation.

11. An integrated label as recited in claim 4 wherein said adhesive becomes de-tackified when exposed to about 3000 $mJ/cm^2$ total dosage of ultraviolet radiation.

12. An integrated label comprising:

a first paper ply having a quadrate configuration and four edges and a first area;

a second quadrate ply comprising a pressure sensitive adhesive release sheet having four edges;

the first and second plies overlapping, including a first edge of the first ply aligned with or overlapped by the second ply;

a continuous strip of pressure sensitive adhesive disposed between the overlapping portions of the first and second leasably holding them together;

at least one label formed in the first ply at the overlapping portions of the first and second plies; and the adhesive at the first and second edges comprising de-tackified adhesive.

13. An integrated label as recited in claim 12 wherein said second ply has a second area significantly smaller than said first area, and wherein said first edge of said first ply is aligned with a first edge of said second ply, and wherein a second edge of said first ply is aligned with a second edge of said second ply.

14. An integrated label as recited in claim 12 in a stack with a plurality of identical integrated labels, the integrated labels in the stack having aligned edges.

15. An integrated label as recited in claim 12 wherein said pressure sensitive adhesive is hot melt adhesive which becomes de-tackified when exposed to a sufficient type and dosage of electromagnetic radiation.

* * * * *